US012521980B2

(12) United States Patent
Kobayashi et al.

(10) Patent No.: US 12,521,980 B2
(45) Date of Patent: Jan. 13, 2026

(54) PRINTING APPARATUS AND PRINTING METHOD

(71) Applicant: SEIKO EPSON CORPORATION, Tokyo (JP)

(72) Inventors: Takashi Kobayashi, Nagano (JP); Atsushi Goto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 18/539,363

(22) Filed: Dec. 14, 2023

(65) Prior Publication Data

US 2024/0198657 A1 Jun. 20, 2024

(30) Foreign Application Priority Data

Dec. 16, 2022 (JP) ................................. 2022-200938

(51) Int. Cl.
*B41J 2/045* (2006.01)
*B41J 29/393* (2006.01)

(52) U.S. Cl.
CPC ......... *B41J 2/04508* (2013.01); *B41J 29/393* (2013.01)

(58) Field of Classification Search
CPC ...... B41J 29/393; B41J 2/2146; B41J 2/2142; B41J 2/04586; B41J 2029/3935; B41J 2/04508; B41J 29/38; B41J 2/12; B41J 2/01; B41J 2/2139; B41J 2/2135; B41J 2/2132; B41J 19/145; B41J 2/04505; B41J 2/0451; G06K 15/027
See application file for complete search history.

(56) References Cited

U.S. PATENT DOCUMENTS

2005/0183603 A1* 8/2005 Trelewicz .............. B41J 29/393 101/484
2019/0126609 A1 5/2019 Mizutani

FOREIGN PATENT DOCUMENTS

JP 2019-081344 A 5/2019

* cited by examiner

*Primary Examiner* — Jannelle M Lebron
(74) *Attorney, Agent, or Firm* — Global IP Counselors, LLP

(57) ABSTRACT

A printing apparatus includes a printing head, a control unit, and a reading unit, and the printing apparatus forms a test pattern for correcting printing characteristics on the medium and corrects the printing characteristics based on a reading result of the test pattern obtained by the reading unit. The control unit acquires moire characteristics information for determining whether moire of a reading density due to an interference between an arrangement of a plurality of dots included in the test pattern and the reading resolution at the reading unit occurs. The control unit controls the ejection of the droplet such that when the moire characteristics information does not indicate occurrence of the moire, the test pattern is formed on the medium N1 times and when the moire characteristics information indicates occurrence of the moire, the test pattern is formed on the medium N2 times, N2 being an integer greater than N1.

8 Claims, 11 Drawing Sheets

MOIRE CHARACTERISTICS INFORMATION IN0

| PRINTING RESOLUTION | READING RESOLUTION | ····· | OCCURRENCE OF MOIRE |
|---|---|---|---|
| X1p × Y1p dpi | X1r × Y1r dpi | ····· | NO |
| X2p × Y2p dpi | X1r × Y1r dpi | ····· | YES |
| X3p × Y3p dpi | X1r × Y1r dpi | ····· | NO |
| ····· | ····· | ····· | ····· |
| X1p × Y1p dpi | X2r × Y2r dpi | ····· | YES |
| X2p × Y2p dpi | X2r × Y2r dpi | ····· | NO |
| ····· | ····· | ····· | ····· |

FIG. 8

PRINTING APPARATUS AND PRINTING METHOD

The present application is based on, and claims priority from JP Application Serial Number 2022-200938, filed Dec. 16, 2022, the disclosure of which is hereby incorporated by reference herein in its entirety.

BACKGROUND

1. Technical Field

The present disclosure relates to a printing apparatus including a reading unit that reads a density of a printing surface, and a printing method.

2. Related Art

As a printing apparatus, an ink-jet printing apparatus including a printing head with a nozzle row capable of ejecting a droplet to a medium, and a reading unit for reading a printing image in a unit of a reading resolution is known. In the printing apparatus of this type, a test pattern for correcting the density of the printing image is printed on a medium, and the density of the printing image is corrected on the basis of the reading result of the test pattern obtained by the reading unit.

The ink-jet recording apparatus disclosed in JP-A-2019-81344 calculates a density-unevenness correction value from the density information obtained by reading the density of the test chart, and performs correction on the image data on the basis of the density-unevenness correction value.

In some situation a periodic density variation called moire may occur in the reading result of the test pattern obtained by the reading unit. Here, "periodic density variation" means occurrence of errors in the reading result of the test pattern, which is different from "density unevenness" of the printing image due to the non-uniformity of the amount of ink ejected from the nozzle. When the moire occurs, an error occurs in the reading result of the test pattern, and as a result, an error originating from the moire occurs in "density-unevenness correction value". In view of this, it is desirable to reduce the influence of moire when reading the test pattern.

SUMMARY

A printing apparatus of the present disclosure includes a printing head including a nozzle row in which a plurality of nozzles configured to eject a droplet to a medium are disposed side by side, a control unit configured to control movement of at least one of the medium and the printing head in a scanning direction intersecting an arrangement direction of the plurality of nozzles, and ejection of the droplet from the printing head, and a reading unit configured to read a density of a printing surface of the medium in a unit of a reading resolution. The printing apparatus forms a test pattern for correcting printing characteristics on the medium and corrects the printing characteristics based on a reading result of the test pattern obtained by the reading unit, the control unit acquires moire characteristics information for determining whether moire of a reading density due to an interference between an arrangement of a plurality of dots included in the test pattern and the reading resolution at the reading unit occurs, when the moire characteristics information does not indicate occurrence of the moire, the control unit controls the ejection of the droplet such that the test pattern is formed on the medium N1 times, N1 being an integer of 1 or more, and when the moire characteristics information indicates occurrence of the moire, the control unit controls the ejection of the droplet such that the test pattern is formed on the medium N2 times, N2 being an integer greater than N1.

A printing method of the present disclosure is a method in which at least one of a medium and a printing head including a nozzle row in which a plurality of nozzles configured to eject a droplet to the medium are disposed side by side is moved along a scanning direction intersecting an arrangement direction of the plurality of nozzles, a test pattern for correcting printing characteristics is formed on the medium by ejecting the droplet from the printing head, and the printing characteristics are corrected based on a reading result of the test pattern obtained by a reading unit configured to read a density of a printing surface of the medium in a unit of a reading resolution. The printing method includes acquiring moire characteristics information for determining whether moire of a reading density due to an interference between an arrangement of a plurality of dots included in the test pattern and the reading resolution at the reading unit occurs, forming the test pattern on the medium N1 times when the moire characteristics information does not indicate occurrence of the moire, N1 being an integer of 1 or more, and forming the test pattern on the medium N2 times when the moire characteristics information indicates occurrence of the moire, N2 being an integer greater than N1.

BRIEF DESCRIPTION OF THE DRAWINGS

FIG. 8 is a diagram schematically illustrating an example of moire characteristics information.

DESCRIPTION OF EMBODIMENTS

Figure 1:
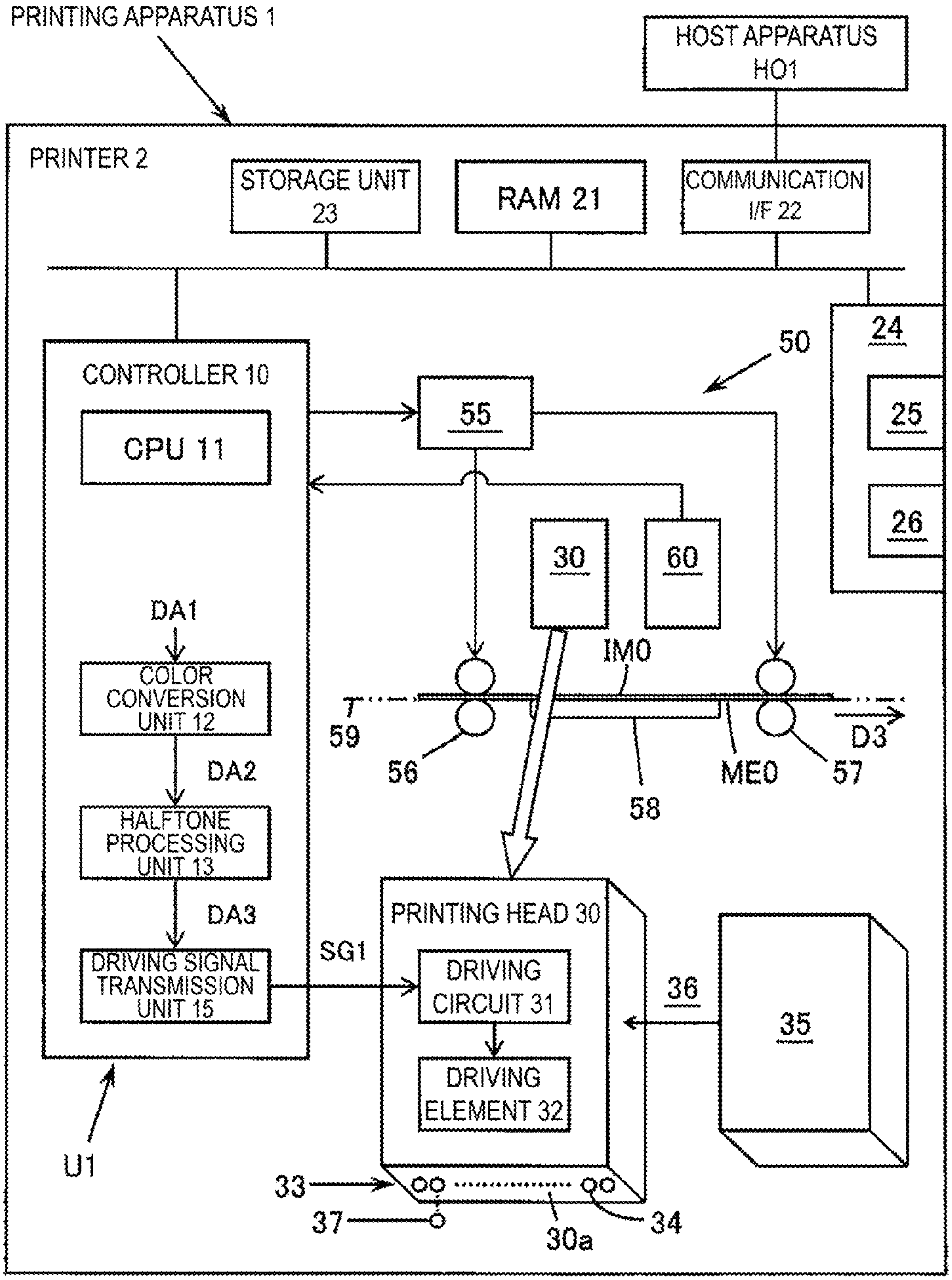
FIG. 1 is a diagram schematically illustrating an example of a printing apparatus.

An embodiment of the present disclosure is described below. Naturally, the following embodiment is merely an example of the present disclosure, all of the features described in the embodiment may not be essential to the solution of the invention.

(1) Overview of Technology Included in Present Disclosure

First, an overview of technology included in the present disclosure is described with reference to the examples illustrated in FIGS. 1 to 11. Note that the drawings of this application are schematic drawings, the enlarging rate in each direction in these drawings may differ, and each drawing may not match each other. Naturally, each element of this technology is not limited to the specific examples represented by the reference numerals. In "Overview of Technology Included in Present Disclosure", the words in parentheses mean supplementary explanation for the immediately preceding words.

First Aspect

A printing apparatus 1 according to an aspect of this technology includes a printing head 30, a control unit U1, and a reading unit 60 (see, e.g., FIG. 1), and a test pattern TP0 for correcting the printing characteristics (see, e.g., FIG. 2) is formed on a medium ME0, and the printing characteristics are corrected on the basis of the reading result of the test pattern TP0 obtained by the reading unit 60. The printing head 30 includes a nozzle row 33 in which a plurality of nozzles 34 that can eject a droplet 37 to a medium ME0 are disposed side by side. The control unit U1 controls the movement of at least one of the medium ME0 and the printing head 30 in the scanning direction (e.g., a feeding direction D3) intersecting an arrangement direction D4 of the plurality of nozzles 34, and ejection of the droplet 37 from the printing head 30. The reading unit 60 reads the density of a printing surface ME0*p* of the medium ME0 in a unit of the reading resolution (e.g., Xr×Yr dpi). As exemplified in FIGS. 7 to 10 and the like, the control unit U1 acquires moire characteristics information IN0 that can determine whether moire of the reading density due to an interference between the arrangement of the plurality of dots 38 included in the test pattern TP0 and the reading resolution at the reading unit 60 occurs. As exemplified in FIGS. 5 and 10 and the like, the control unit U1 controls the ejection of the droplet 37 such that the test pattern TP0 is formed on the medium ME0 N1 times when the moire characteristics information IN0 does not indicate the occurrence of moire (N1 is an integer of 1 or more). The control unit U1 controls the ejection of the droplet 37 such that the test pattern TP0 is formed on the medium ME0 N2 times when the moire characteristics information IN0 indicates the occurrence of moire (N2 is an integer greater than N1).

In the case where the moire occurs, the test pattern TP0 for correcting the printing characteristics is formed on the medium ME0 N2 times, which is greater than N1 times for the case where moire does not occur. The test patterns TP0 for N2 times are read by the reading unit 60, and thus reading results with less influence of moire can be obtained. On the other hand, in the case where the moire does not occur, the test pattern TP0 is formed on the medium ME0 only N1 times, which is less than N2 times for the case where the moire occurs. In this manner, the number of the formed test patterns TP0 can be reduced. Thus, the above-described aspect can provide a printing apparatus that can efficiently reduce the influence of moire when reading the test pattern.

Here, the scanning direction includes a direction along the relative movement direction of the medium in a line-type printing apparatus, a main scanning direction in a serial-type printing apparatus, and the like.

The control unit may perform a control of moving the medium along the scanning direction without moving the printing head, a control of moving the printing head along the scanning direction without moving the medium, or a control of moving both the medium and the printing head along the scanning direction.

In general, the moire means interference fringes that occur due to superimposition of a plurality of periodic structures. In the above-described aspect, one of the periodic structures means an arrangement of a plurality of dots included in the test pattern. Another periodic structure means the reading resolution at the reading unit such as the arrangement of a plurality of reading elements serving as the reading resolution.

The printing characteristics include the density of the printing image, the conveyance amount of the medium, the forward and backward discharging timing in a serial-type printing apparatus, and the like. As such, the test pattern includes various test patterns to be influenced by the moire.

The moire characteristics information may be acquired by actually reading the test pattern by the reading unit, or may be acquired from analysis results based on the arrangement of a plurality of dots determined from test pattern data representing the test pattern and the reading resolution at the reading unit.

Note that the above-described notes apply also to the following aspects.

Second Aspect

Figure 2:
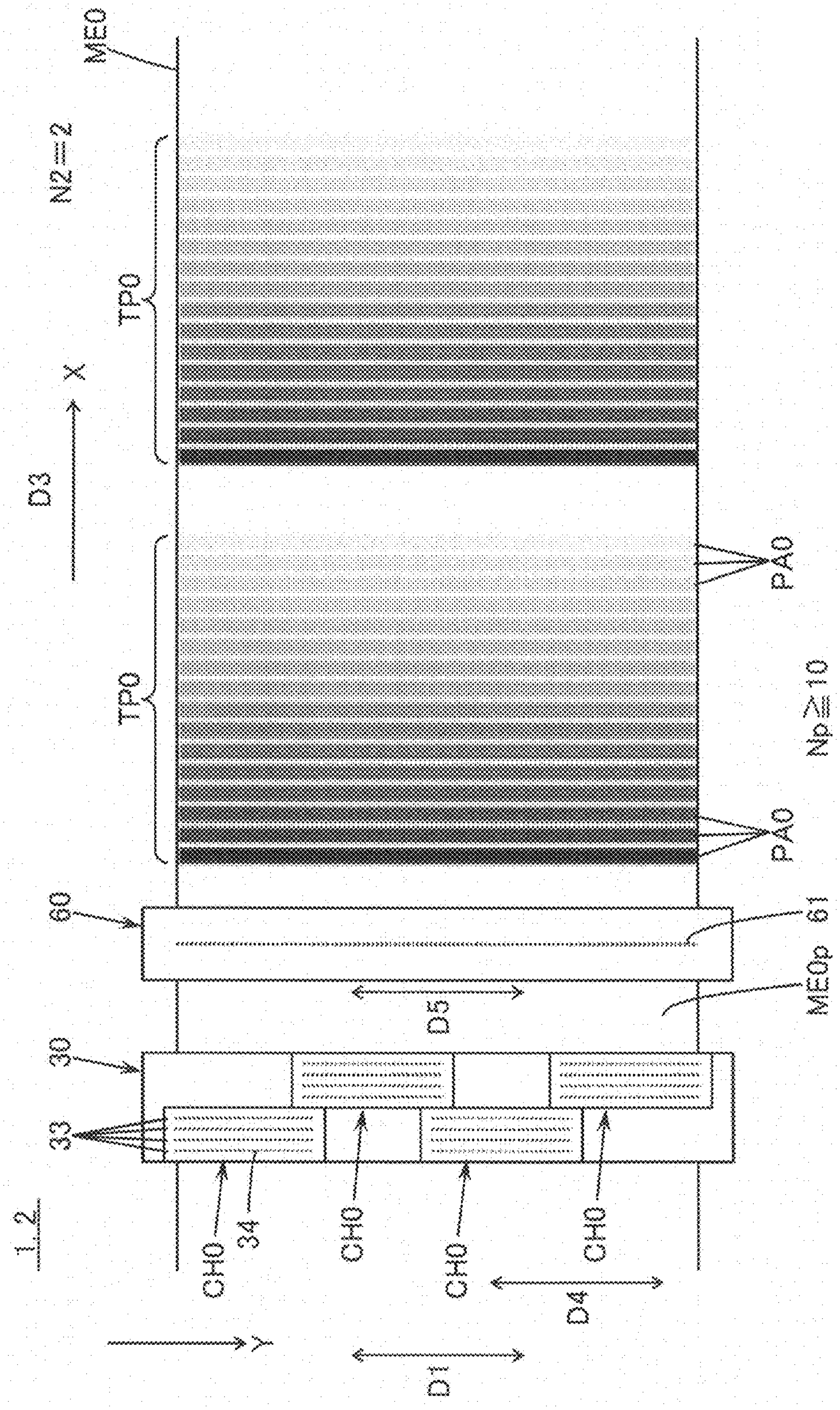
FIG. 2 is a plan view schematically illustrating an example of the printing apparatus and a test pattern.

As exemplified in FIG. 2, the test pattern TP0 may include patches PA0 with densities of a plurality of levels (Np levels) disposed side by side in the scanning direction (D3). When the moire characteristics information IN0 indicates the occurrence of moire, the control unit U1 may control the ejection of the droplet 37 to form the test pattern TP0 including the patches PA0 with densities of the plurality of levels (Np levels) at N2 locations on the medium ME0.

In this case, since it only needs to store one test pattern TP0 to form the test pattern TP0 at N2 locations, and the storage capacity can be saved.

Third Aspect

As exemplified in FIG. 2, the patches PA0 with densities of the plurality of levels (Np levels) may be the patches PA0 with densities of 10 or more levels.

The correction of the liquid ejection rate in accordance with the gradation value is somewhat more reliable when there are 10 or more levels. Therefore, the above-described aspect provides a suitable printing apparatus that reduces the influence of moire when reading the test pattern for correcting the density of the printing image.

Fourth Aspect

As exemplified in FIG. 1, this printing apparatus 1 may further include a conveyance unit 50 that moves at least one of the medium ME0 and the printing head 30 so as to change the medium ME0 from the position facing the printing head 30 to the position facing the reading unit 60.

In this case, no manual operation is performed from formation to reading of the test pattern TP0, and therefore there is less influence of manual operation on the moire of the reading density. Thus, the above-described aspect can provide a suitable printing apparatus that reduces the influence of moire when reading the test pattern.

Fifth Aspect

As exemplified in FIG. 1, this printing apparatus 1 may further include the conveyance unit 50 that moves at least one of the medium ME0 and the printing head 30 along the scanning direction (D3) so as to change the medium ME0 from the position facing the printing head 30 to the position facing the reading unit 60. When the moire characteristics information IN0 indicates the occurrence of moire, the control unit U1 may control the ejection of the droplet 37 to form the test pattern TP0 including the patches PAG with densities of the plurality of levels (Np levels) at different N2 locations in the scanning direction (D3) on the medium ME0. As exemplified in FIG. 2, the reading unit 60 may include a plurality of reading elements 61 disposed side by side so as to have the reading resolution along an element arrangement direction D5 intersecting the scanning direction (D3), and may read the density of the printing surface ME0*p* with the plurality of reading elements 61.

The above-described aspect can provide a line-type printing apparatus that can efficiently reduce the influence of moire when reading the test pattern.

Sixth Aspect

Figure 5:
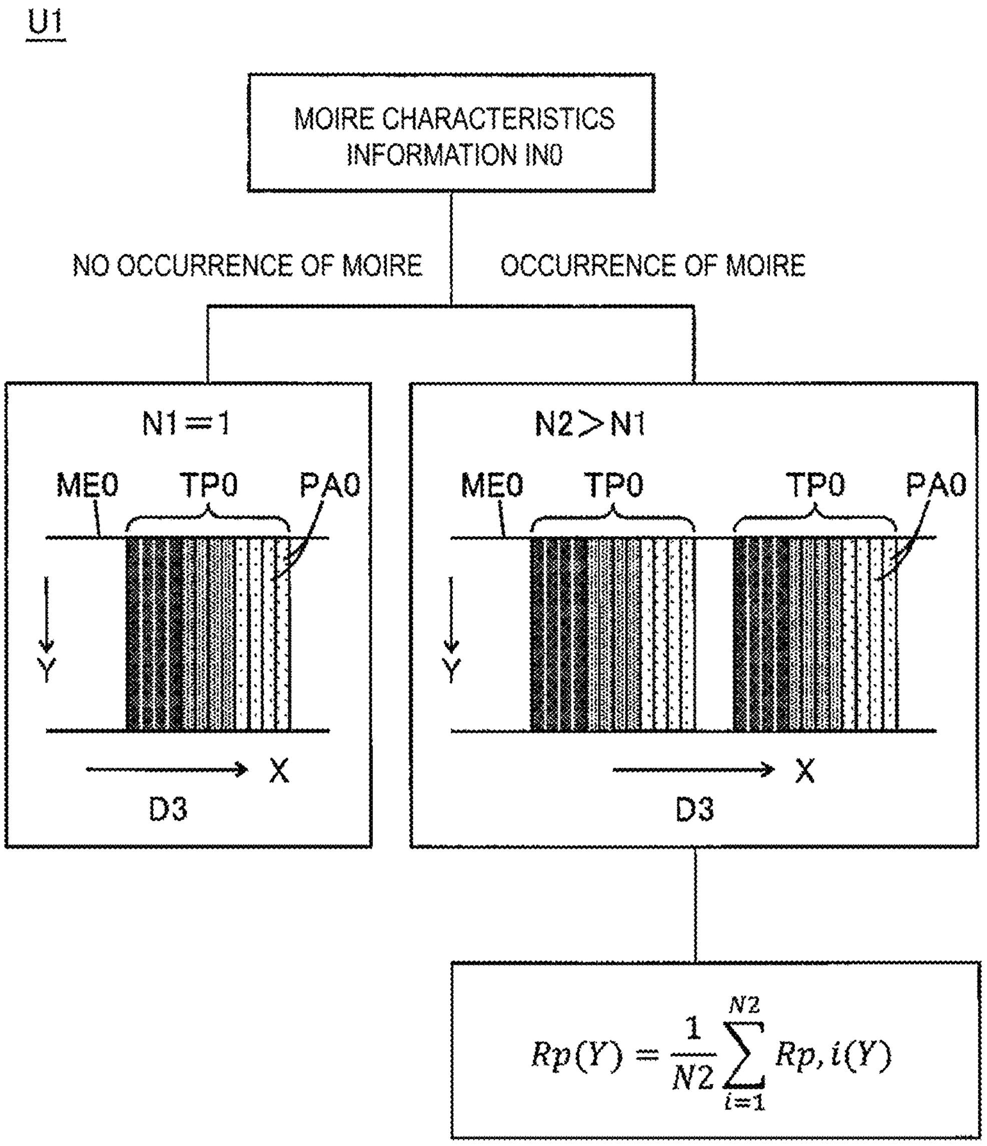
FIG. 5 is a diagram schematically illustrating an example in which a control unit performs a control of forming the number of test patterns corresponding to moire characteristics information.
Figure 10:
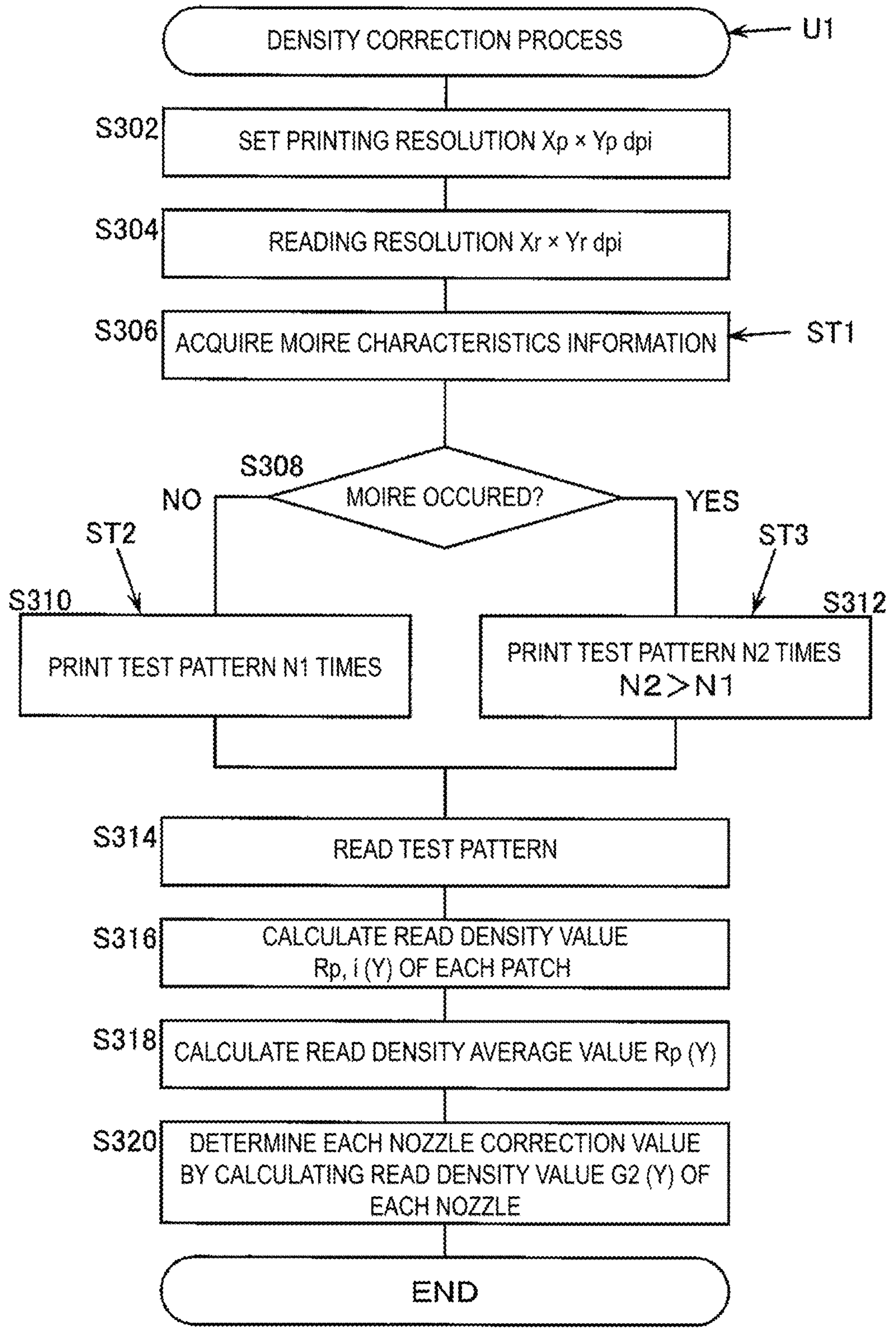
FIG. 10 is a flowchart schematically illustrating an example of a density correction process.

As exemplified in FIGS. 5 and 10 and the like, the control unit U1 may acquire the read density (e.g., a read density value Rp, i (Y)) of each of the N2 test patterns TP0 on the basis of the reading result. The control unit U1 may calculate the correction value for correcting the printing characteristics (e.g., density correction value G3 (Y) illustrated in FIG. 6) by performing a calculation process including a computation of averaging the read density (Rp, i (Y)) obtained N2 times.

According to the above-described aspect, a correction value with less influence of moire can be obtained.

Here, the average of the read density may be a median value, a weighted average or the like, and is not limited to the calculation method of dividing the sum of the sample by the population. This note applies also to the following aspects.

Seventh Aspect

In addition, in the printing method according to an aspect of this technology, at least one of the medium ME0 and the printing head 30 that can eject the droplet 37 to the medium ME0 with the nozzle row 33 of the plurality of nozzles 34 disposed side by side is moved along the scanning direction (D3) intersecting the arrangement direction D4 of the plurality of nozzles 34, the test pattern TP0 for correcting the printing characteristics is formed on the medium ME0 by ejecting the droplet 37 from the printing head 30, and the printing characteristics are corrected on the basis of the reading result of the test pattern TP0 obtained by the reading unit 60 that reads the density of the printing surface ME0*p* of the medium ME0 in a unit of the reading resolution. The the printing method includes the following steps.

(A1) An acquisition step ST1 of acquiring the moire characteristics information IN0 that can determine whether the moire of the reading density due to an interference between the arrangement of the plurality of dots 38 included in the test pattern TP0 and the reading resolution at the reading unit 60 occurs.

(A2) A first formation step ST2 of forming the test pattern TP0 on the medium ME0 N1 times when the moire characteristics information IN0 does not indicate the occurrence of moire (N1 is an integer of 1 or more).

(A2) A second formation step ST3 of forming the test pattern TP0 on the medium ME0 N2 times when the moire characteristics information IN0 indicates the occurrence of moire (N2 is an integer greater than N1).

The above-described aspect can provide a printing method that can efficiently reduce the influence of moire when reading the test pattern.

Here, in this application, “first”, “second”, are terms for distinguishing each component included in a plurality of similar components, and do not mean the order.

Further, this technology can be applied to a printing system including the above-described printing apparatus, a control method for the above-described printing apparatus, a control method for the above-described printing system, a control program for the above-described printing apparatus, a control program for the above-described printing system, a computer-readable recording medium storing any of the above-described control programs, and the like. In addition, the above-described printing apparatus may be composed of a plurality of dispersed portions.

(2) Specific Examples of Printing Apparatus Including Printing Apparatus

Figure 3:
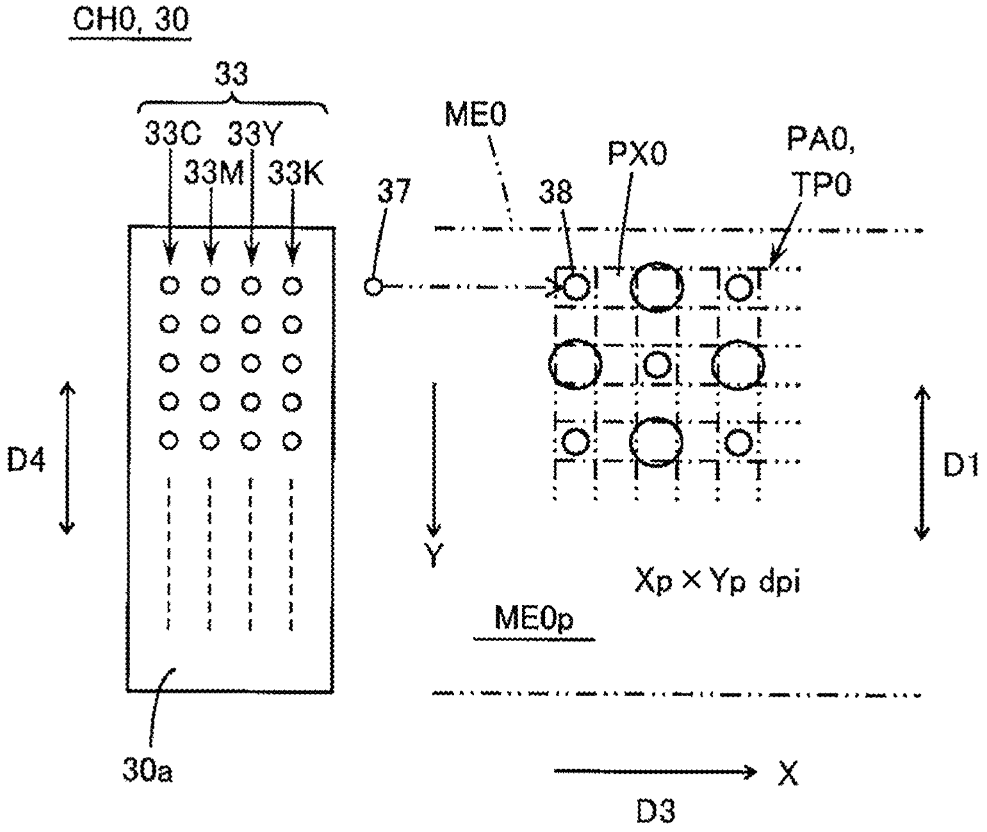
FIG. 3 is a diagram schematically illustrating an example of a nozzle surface of a printing head and a dot pattern on a medium.
Figure 4:
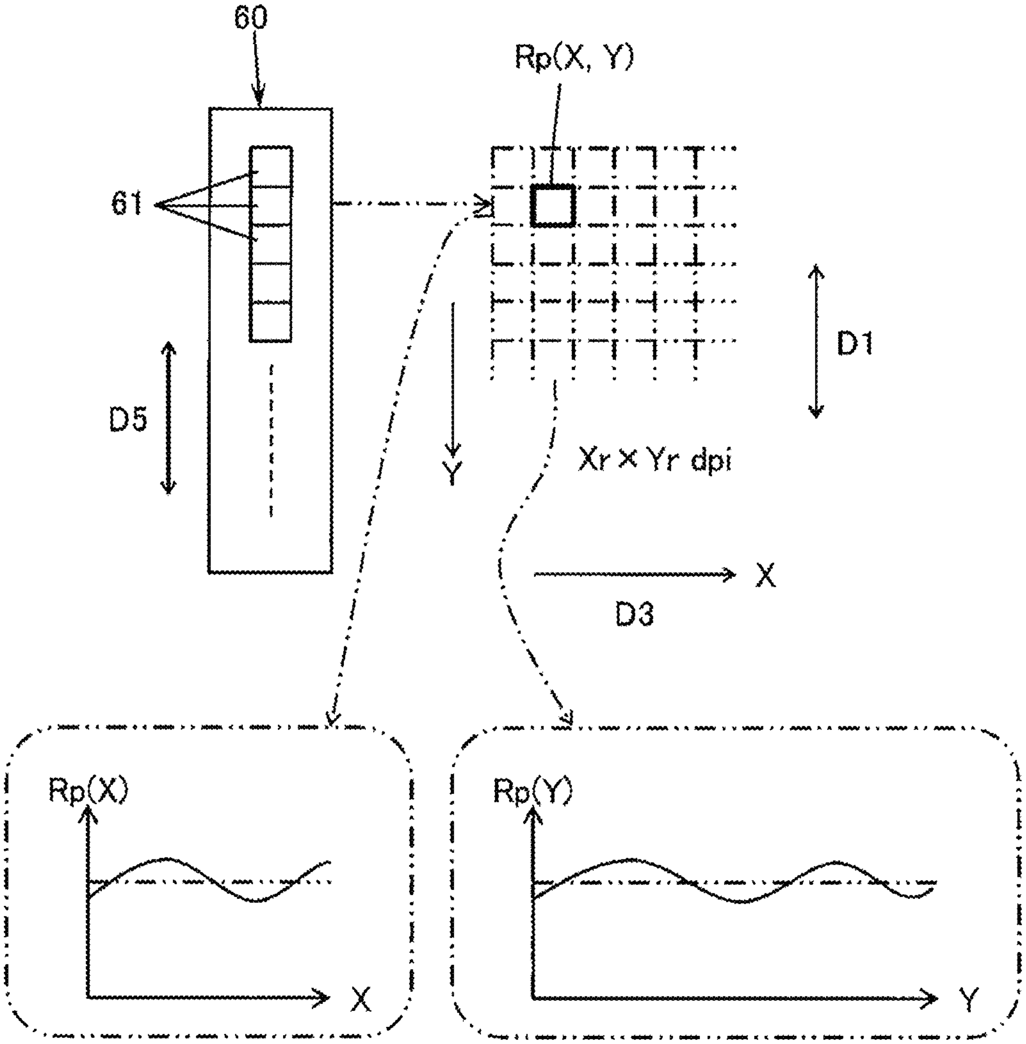
FIG. 4 is a diagram schematically illustrating an example of a read density value Rp (X, Y) of a test pattern.

FIG. 1 is a diagram schematically illustrating an example of the printing apparatus 1. The printing apparatus 1 of this specific example is a printer 2 itself, but the printing apparatus 1 may be a combination of the printer 2 and a host apparatus HO1. The printer 2 illustrated in FIG. 1 is a serial printer, which is a type of ink-jet printer that ejects ink drops as the droplet 37. Note that the printer 2 may include additional components not illustrated in FIG. 1. FIG. 2 is a diagram schematically illustrating an example of the printing apparatus 1 and the test pattern TP0. The test patterns TP0 for two times are formed on the printing surface ME0*p* of the medium ME0 illustrated in FIG. 2. FIG. 3 is a diagram schematically illustrating an example of a nozzle surface 30*a* of the printing head 30 and a dot pattern on the medium ME0. FIG. 4 is a diagram schematically illustrating an example of the read density value Rp (X, Y) of the test pattern TP0. For convenience, the X direction is the direction along the feeding direction D3, and the Y direction is the direction along a width direction D1. The left lower portion of FIG. 4 illustrates an example of moire of the read density value Rp (X) along the X direction at a certain Y position. The right lower portion of FIG. 4 illustrates an example of moire of the read density value Rp (Y) along the Y direction at a certain X position.

The printer 2 illustrated in FIG. 1 includes a controller 10, a RAM 21 as a semiconductor memory, a communication I/F 22, a storage unit 23, an operation panel 24, the printing head 30, the conveyance unit 50, the reading unit 60, and the like. Here, RAM is an abbreviation for Random Access Memory, and I/F is an abbreviation for interface. The controller 10 is an example of the control unit U1. The controller 10, the RAM 21, the communication I/F 22, the storage unit 23, and the operation panel 24 are coupled to a bus such that information can be input and output.

The controller 10 includes a CPU 11 as a processor, a color conversion unit 12, a halftone processing unit 13, a driving signal transmission unit 15, and the like. Here, CPU is an abbreviation for Central Processing Unit. The controller 10 controls the conveyance unit 50 and the printing head 30 such that a printing image IMO is formed on the printing surface ME0*p* of the medium ME0 on the basis of original image data DA1 acquired from the host apparatus HO1, a memory card not illustrated in the drawing or the like. RGB data with integer values of $2^8$ gradations or $2^{16}$ gradations of R, G, and B for each pixel can be applied to the original image data DA1, for example. Here, R, G, and B mean red, green and blue, respectively.

The controller 10 may be composed of a SoC or the like. Here, SoC is an abbreviation for System on a Chip.

The CPU 11 is an apparatus for centrally performing information processing and control in the printer 2.

With reference to a color conversion LUT that maps the correspondence relationship between R, G, and B gradation values and C, M, Y, and K gradation values, the color conversion unit 12 converts the RGB data into ink amount data DA2 with integer values of $2^8$ gradations or $2^{16}$ gradations of C, M, Y, and K for each pixel, for example. Here, C, M, Y and K mean cyan, magenta, yellow and black, respectively, and LUT is an abbreviation for look-up table. The ink amount data DA2 represents the use amount of C, M, Y, and K liquid 36 in a unit of the pixel PX0 illustrated in FIG. 3. In addition, in the case where the resolution of the RGB data is different from a printing resolution Xp×Yp dpi, the color conversion unit 12 converts the resolution of the RGB data into the printing resolution Xp×Yp dpi first, or converts the resolution of the ink amount data DA2 into the printing resolution Xp×Yp dpi. In FIG. 3, the printing resolution is Xp×Yp dpi, i.e., the printing resolution in the X direction along the feeding direction D3 is Xp dpi, and the printing resolution is Yp dpi in the Y direction along the width direction D1.

The halftone processing unit 13 generates dot data DA3 by reducing the number of gradations of the gradation value by performing a halftone process of any of dither methods, error diffusion methods, and the like on the gradation value of each pixel PX0 making up the ink amount data DA2. The dot data DA3 represents the formation state of a dot 38 of the droplet 37 in a unit of the pixel PX0. The dot data DA3 may be binary data representing the presence/absence of the dot formation, or multivalued data of three or more gradations that can accommodate dots with different sizes such as small, medium and large dots.

The driving signal transmission unit 15 generates a driving signal SG1 from the dot data DA3 and outputs it to a driving circuit 31 of the printing head 30. The driving signal SG1 corresponds to a voltage signal applied to a driving element 32 of the printing head 30. For example, in the case where the dot data DA3 is "dot formation", the driving signal transmission unit 15 outputs the driving signal SG1 for ejecting droplets for forming dots. In addition, in the case where the dot data DA3 is 4-value data, the driving signal transmission unit 15 outputs the driving signal SG1 for ejecting a large dot droplet when the dot data DA3 is "large dot formation", the driving signal SG1 for ejecting a medium dot droplet when the dot data DA3 is "medium dot formation", and the driving signal SG1 for ejecting a small dot droplet when the dot data DA3 is "small dot formation".

The above-described units 11, 12, 13 and 15 may be composed of ASIC, and may directly read data to be processed from the RAM 21 and directly write processed data to the RAM 21. Here, ASIC is an abbreviation for Application Specific Integrated Circuit.

The printing head 30 is disposed upstream of the reading unit 60. As illustrated in FIGS. 1 to 3, the printing head 30 includes at the nozzle surface 30*a* the nozzle row 33 in which the plurality of nozzles 34 that can eject the droplet 37 to the medium ME0 are disposed side by side at a predetermined nozzle pitch interval in the arrangement direction D4. Here, the nozzle means a small hole for jetting droplets, and the nozzle row means the arrangement of a plurality of nozzles. The nozzle surface 30*a* is the ejecting surface of the droplet 37. As illustrated in FIG. 2, the printing head 30 includes a plurality of chips CHO in which the plurality of nozzles 34 is successively disposed side by side over the width direction D1 orthogonal to the feeding direction D3 of the medium ME0. As illustrated in FIG. 3, each chip CHO includes a plurality of nozzle rows 33. The plurality of nozzle rows 33 includes a cyan nozzle row 33C for ejecting the C droplet 37, a magenta nozzle row 33M for ejecting the M droplet 37, a yellow nozzle row 33Y for ejecting the Y droplet 37, and a black nozzle row 33K for ejecting the K droplet 37. Each droplet 37 is ejected from the nozzles 34 toward the pixel PX0 of the medium ME0. Naturally, the C dot 38 is formed from the C droplet 37 on the medium ME0, the M dot 38 is formed from the M droplet 37 on the medium ME0, the Y dot 38 is formed from the Y droplet 37 on the medium ME0, and the K dot 38 is formed from the K droplet 37 on the medium ME0. Each nozzle row 33 ejects the droplet 37 toward the medium ME0. The plurality of nozzles 34 included in each nozzle row 33 may be disposed side by side in a line, or disposed side by side in a staggered manner, i.e., in two lines. The arrangement direction D4 of the plurality of nozzles 34 included in the nozzle row 33 may be the width direction D1, or may be shifted from the width direction D1 as long as it is different from the feeding direction D3.

The conveyance unit 50 controlled by the controller 10 sends the medium ME0 in the feeding direction D3 along a conveyance path 59 through the driving of a roller driving unit 55. In FIG. 1, the feeding direction D3 is the right direction, and the left side and the right side are referred to as upstream side and downstream side, respectively. The feeding direction D3 is an example of the scanning direction intersecting the arrangement direction D4 of the plurality of nozzles 34, and is a direction orthogonal to the arrangement direction D4, for example. The roller driving unit 55 includes a conveyance roller pair 56 and an ejection roller pair 57. The roller driving unit 55 is composed of a servomotor, and sends the medium ME0 at a constant speed in the feeding direction D3 by rotating at a constant speed the drive conveyance roller of the conveyance roller pair 56 and the drive ejection roller of the ejection roller pair 57 under the control of the controller 10. Therefore, it can be said that the conveyance unit 50 moves at least one of the medium ME0 and the printing head 30 along the feeding direction D3, and that the control unit U1 controls the movement of at least one of the medium ME0 and the printing head 30 in the feeding direction D3. In addition, since the reading unit 60 is disposed downstream of the printing head 30, it can be said that the conveyance unit 50 moves at least one of the medium ME0 and the printing head 30 such that the medium ME0 is changed from the position facing the printing head 30 to the position facing the reading unit 60.

The medium ME0 is a material that holds printing images, and is formed of paper, resin, metal, or the like. The material of the medium ME0 is not limited, and may be various materials such as resin, metal, and paper. The shape of the medium ME0 is also not limited, and may have various shapes such as rectangular shapes, roll shapes, and three-dimensional shapes.

A platen 58 is located on the lower side of the conveyance path 59, and supports the medium ME0 by making contact with the medium ME0 located at the conveyance path 59. The printing head 30 to be controlled by the controller 10 includes the driving circuit 31, the driving element 32 and the like, and attaches liquid 36 to the medium ME0 by ejecting the droplet 37 toward the medium ME0 supported by the platen 58. As such, it can be said that the control unit U1 controls the droplet 37 from the printing head 30.

The driving circuit 31 applies a voltage signal to the driving element 32 in accordance with the driving signal SG1 input from the driving signal transmission unit 15. The driving element 32 may be a piezoelectric element that applies pressure to the liquid 36 inside the pressure chamber communicated with the nozzle 34, a driving element that ejects the droplet 37 from the nozzle 34 by generating bubbles inside the pressure chamber with heat, or and the like. The liquid 36 is supplied from liquid cartridge 35 to the pressure chamber of the printing head 30. The liquid 36 inside the pressure chamber is ejected as the droplet 37 from the nozzle 34 toward the medium ME0 by the driving element 32. In this manner, the dot 38 of the droplet 37 is formed on the printing surface ME0*p* of the medium ME0, the printing image IMO expressed by the pattern of the dot 38 is formed on the printing surface ME0*p* of the medium ME0.

The RAM 21 stores the original image data DA1 and the like received from the host apparatus HO1, a memory not illustrated in the drawing or the like. The communication I/F 22 is coupled to the host apparatus HO1 in a wired or wireless manner, and inputs and outputs information to and from the host apparatus HO1. The host apparatus HO1 includes computers such as personal computers and tablet terminals, mobile phones such as smartphones, digital cameras, digital video camcorders, and the like. The storage unit 23 may be a nonvolatile semiconductor memory such as a flash memory, a magnetic storage device such as a hard disk, or the like. The operation panel 24 includes an output unit 25 such as a liquid crystal panel for displaying information, an input unit 26 such as a touch panel for receiving operations on the display screen, and the like.

The controller 10 controls the ejection of the droplet 37 so as to form on the medium ME0 the test pattern TP0 for correcting the density of the printing image IMO, and corrects the density of the printing image IMO on the basis of the reading result of the test pattern TP0 obtained by the reading unit 60. The density of the printing image IMO is an example of printing characteristics. As illustrated in FIG. 2, the test pattern TP0 includes the patches PAG with densities of Np levels disposed side by side in the feeding direction D3. Each patch PAG has a slender rectangular shape of which the longitudinal direction is set to the width direction D1 so that the ejection rate of the liquid 36 from all nozzles 34 used for the printing, e.g., the ink ejection rate, can be corrected. The correction of the liquid ejection rate in accordance with the gradation value is somewhat more reliable when there are 10 or more levels. In view of this, preferably, the number of levels Np of density is 10 or greater, and is 16 in the example illustrated in FIG. 2. The test pattern TP0 may have a single color such as an achromatic color, or may be provided for each color of C, M, Y, and K. The reading unit 60 reads the density of the printing surface ME0*p* of the medium ME0 in a unit of the reading resolution. In FIG. 4, a reading resolution is Xr×Yr dpi, i.e., the reading resolution in the X direction along the feeding direction D3 is Xr dpi, and the reading resolution in the Y direction along the width direction D1 is Yr dpi.

The reading unit 60 includes the plurality of reading elements 61 disposed side by side such that a reading resolution Yr is set along the element arrangement direction D5 intersecting the feeding direction D3, and reads the density of the printing surface ME0*p* with the plurality of reading elements 61. The element arrangement direction D5 illustrated in FIGS. 2 and 4 is orthogonal to the feeding direction D3. The element arrangement direction D5 may be the width direction D1, may be shifted from the width direction D1 as long as it is different from the feeding direction D3, may be the arrangement direction D4 of the nozzle 34, or may be shifted from the arrangement direction D4 as long as it is different from the feeding direction D3. The reading unit 60 is disposed downstream of the printing head 30. The reading unit 60 may be an image sensor of a contact image sensor (abbreviated as CIS) type, an image sensor of a charge coupled device (abbreviated as CCD) type, a solid imaging element such as a CMOS image sensor and a line sensor or an area sensor composed of CCD, or the like. Here, CMOS is an abbreviation for Complementary Metal-Oxide Semiconductor. CIS image sensors widely used in recent years are inexpensive and can achieve downsizing, but easily cause the moire of the read density in comparison with CCD sensors. This specific example is suitable for the case where the reading unit 60 is a CIS image sensor.

In the case where the reading unit 60 is a CIS image sensor, it includes a light-emitting diode, a lens, the plurality of reading elements 61, and the like. The light-emitting diode may include three types of light-emitting diodes, namely, a red light-emitting diode that emits red light, a green light-emitting diode that emits green light, and a blue light-emitting diode that emits blue light. The light-emitting diode applies light to the printing surface ME0*p* of the medium ME0 conveyed in the feeding direction D3. The light applied to the printing surface ME0*p* from the light-emitting diode is reflected by the printing surface ME0*p* to reach the plurality of reading elements 61 through the lens, and measured at each reading element 61. The arrangement density of the reading elements 61 is adapted to the reading resolution Yr in the Y direction, and is not limited. For example, the arrangement density of the reading elements 61 may be equivalent to 300 to 600 dpi. The reading resolution Xr in the X direction is set in accordance with the read timing of each reading element 61, and is not limited. For example, the reading resolution Xr in the X direction may be equivalent to 300 to 600 dpi. The reading unit 60 of this specific example includes an analog/digital conversion circuit that converts the analog amount of the detection voltage of each reading element 61 into a digital value, and the analog density mount corresponding to the detection voltage of each reading element 61 is converted into a digital density value at the analog/digital conversion circuit, and output to the controller 10.

As illustrated in FIG. 3, the printing head 30 ejects the droplet 37 from the plurality of nozzles 34 in a unit of the printing resolution Xp×Yp such that the test pattern TP0 is formed on the printing surface ME0*p* of the medium ME0 moving in the feeding direction D3. The patch PA0 included in the test pattern TP0 has a constant density in its entirety, and thus includes a dot pattern with a periodic structure. As illustrated in FIG. 4, the reading unit 60 reads the density of the printing surface ME0*p* in a unit of the reading resolution Xr×Yr. As such, the reading unit 60 includes a periodic structure corresponding to the reading resolution Xr×Yr.

Therefore, when the reading unit 60 reads the test pattern TP0, there is a possibility of the occurrence of moire of the read density value Rp (X, Y) due to the interference between the arrangement of the plurality of dots 38 included in the test pattern TP0 and the reading resolution Xr×Yr at the reading unit 60. For example, when the printing resolution Xp is close to the reading resolution Xr or the printing resolution Yp is close to the reading resolution Yr, the moire of the read density value Rp (X, Y) easily occurs. If the arrangement direction D4 of the nozzle 34 is shifted from the standard or the element arrangement direction D5 is shifted from the standard, the moire with a far larger cycle than the unit of the reading resolution Xr×Yr may occur in the read density value Rp (X, Y).

When the patch PA0 with a constant density is read, the read density value Rp (X) along the X direction and the read density value Rp (Y) along the Y direction would be substantially constant as illustrated with the chain double-dashed line in the left lower portion and the lower right portion in FIG. 4 as long as the moire does not occur. The reason for the expression “substantially constant” is that in some cases the read value of each reading element 61 contains minute noise. When the moire occurs in the read density (Rp (X), Rp (Y)), a periodic variation larger than minute noise occurs in the read density (Rp (X), Rp (Y)). In other words, when the moire occurs in the read density (Rp (X, Y)), a periodic variation larger than minute noise occurs in the read density (Rp (X, Y)). When the moire occurs in the read density (Rp (X, Y)), an error occurs in the reading result of the test pattern TP0, and consequently an error originating from the moire occurs in the correction value of the liquid ejection rate such as the ink ejection rate. In view of this, it is desirable to reduce the influence of moire when reading the test pattern TP0.

In this specific example, by using the moire characteristics information IN0 that can determine whether the moire of the read density (Rp (X, Y)) due to the interference between the reading resolution Xr×Yr and the dot pattern in the test pattern TP0 occurs, the influence of moire is efficiently reduced.

FIG. 5 schematically illustrates an example in which the control unit U1 performs a control of forming the number test patterns TP0 corresponding to the moire characteristics information IN0. Details of the moire characteristics information IN0 are described later.

When acquiring the moire characteristics information IN0, the control unit U1 determines whether the moire characteristics information IN0 indicates the occurrence of moire. When the moire characteristics information IN0 does not indicate the occurrence of moire, the control unit U1 controls the ejection of the droplet 37 such that the test pattern TP0 including the patches PA0 with densities of Np levels is formed N1 times on the printing surface ME0*p* of the medium ME0. It should be noted that N1 is an integer of 1 or more. FIG. 5 illustrates printing of the test pattern TP0 for one time in the case of N1=1. On the other hand, when the moire characteristics information IN0 does not indicate the occurrence of moire, the control unit U1 controls the ejection of the droplet 37 such that the test pattern TP0 including the patches PAC with densities of Np levels is formed N2 times on the printing surface ME0*p* of the medium ME0. It should be noted that N2 is an integer greater than N1. FIG. 5 illustrates printing of the test pattern TP0 at different N2 locations in the feeding direction D3 in the case of N2=2.

When the moire occurs in the read density value Rp (X, Y), the test pattern TP0 including the patches PAC with densities of Np levels is formed on the printing surface ME0*p* of the medium ME0 N2 times, which is greater than N1 times for the case where moire does not occur. When the average value of the read density is determined for each density of the patch PA0, the density value with less influence of moire is obtained. Here, i is the variable for distinguishing each test pattern TP0. The variable i is an integer from 1 to N2. To correct the liquid ejection rate of each nozzle 34, the control unit U1 determines, for each patch PA0, the read density value Rp, i (Y) obtained by averaging the read density value Rp, i (X, Y) for each Y position. Next, the control unit U1 determines a read density average value Rp (Y) obtained by averaging the read density value Rp, i (Y) for each density of the patch PA0. In the case where the read density average value Rp (Y) is the arithmetic mean of the read density value Rp, i (Y), the read density average value Rp (Y) is calculated by the following equation.

[Equation 1]

$$Rp(Y) = \frac{1}{N2}\sum_{i=1}^{N2} Rp,\, i(Y) \tag{1}$$

The average of the read density value is not limited to the arithmetic mean, and may be the median value, weighted average, geometric mean, harmonic mean, and the like.

In this manner, the control unit U1 calculates the correction value for correcting the density of the printing image IMO by acquiring the read density (Rp, i (Y)) of each test pattern TP0 of N2 times on the basis of the reading result, and performing a calculation process including averaging computation of the read density (Rp, i (Y)) for N2 times.

The moire of the reading density occurred in a plurality of the patches PA0 with the same density tends to be different from each other. In view of this, by averaging the read density value Rp, i (Y), the read density average value Rp (Y) with less influence of moire is obtained, and the correction value with less influence of moire is calculated.

As illustrated in FIG. 2, the order of the patches PA0 with densities of Np levels making up each test pattern TP0 in the feeding direction D3 may be the same. If the patches PA0 with the same density are located at positions close to each other in the feeding direction D3, the interval of these patches PA0 may be shorter than the cycle of the moire. In this case, the influence of moire may largely appear in the read density average value Rp (Y), and the influence of moire may largely appear in the correction value. When the order of the patches PA0 with densities of Np levels is the same among the test patterns TP0, the patches PA0 with the same density are located at distant locations in the feeding direction D3, and thus the interval of these patches PA0 can be longer than the cycle of the moire. Thus, the read density average value Rp (Y) with less influence of moire is obtained, and the correction value with less influence of moire is obtained.

Figure 6:
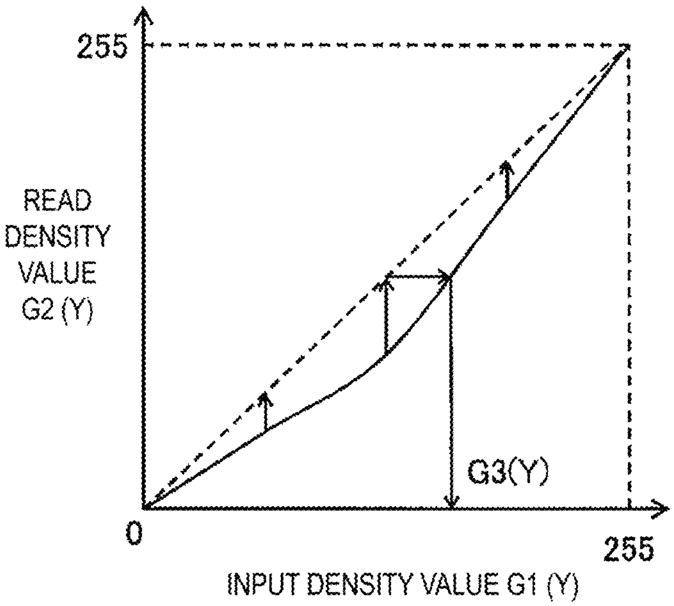
FIG. 6 is a diagram schematically illustrating an example of density correction in a unit of nozzle.

FIG. 6 is a diagram schematically illustrating an example of density correction in a unit of nozzle by using the read density value or the read density average value Rp (Y) in a unit of the reading resolution Yr. In FIG. 6, the abscissa indicates an input density value G1 (Y) corresponding to test pattern data for forming the test pattern TP0, the ordinate indicates a read density value G2 (Y) corresponding to the nozzle 34, and the curve indicates a correspondence relationship between the input density value G1 (Y) and the read density value G2 (Y). The input density value G1 (Y) is a gradation value corresponding to the density of the patch PA0, and is, for example, discrete values such as 16, 32, . . . , in gradation values of 0 to 255. The read density value G2 (Y) is a density value determined from the read density average value Rp (Y) in a unit of the reading resolution Yr for each nozzle 34 and the like, and is represented by gradation values 0 to 255, for example.

When the test pattern TP0 including the patch PA0 of the input density value G1 (Y) of Np levels is printed, and the read density value G2 (Y) in a unit of nozzle is determined from the read density average value Rp (Y) of the patch PA0 of each density and the like, a correspondence relationship as illustrated with the curve in FIG. 6 is obtained. The density correction of the printing image IMO is performed such that the read density value G2 (Y) is the input density value G1 (Y) for the ink amount data DA2, for example. The correction value of the density of the printing image IMO is a value for correcting the read density value G2 (Y) to the input density value G1 (Y), and may be a value representing a difference between the input density value G1 (Y) and the read density value G2 (Y), or the read density value G2 (Y) itself. As illustrated in FIG. 6, the input density value G1 (Y) corresponding to the read density value G2 (Y) may be determined for all gradation values of 0 to 255 as the density correction value G3 (Y). In this case, the correction value of the density of the printing image IMO may be the density correction value G3 (Y).

(3) Specific Examples of Moire Characteristics Information

Figure 7:
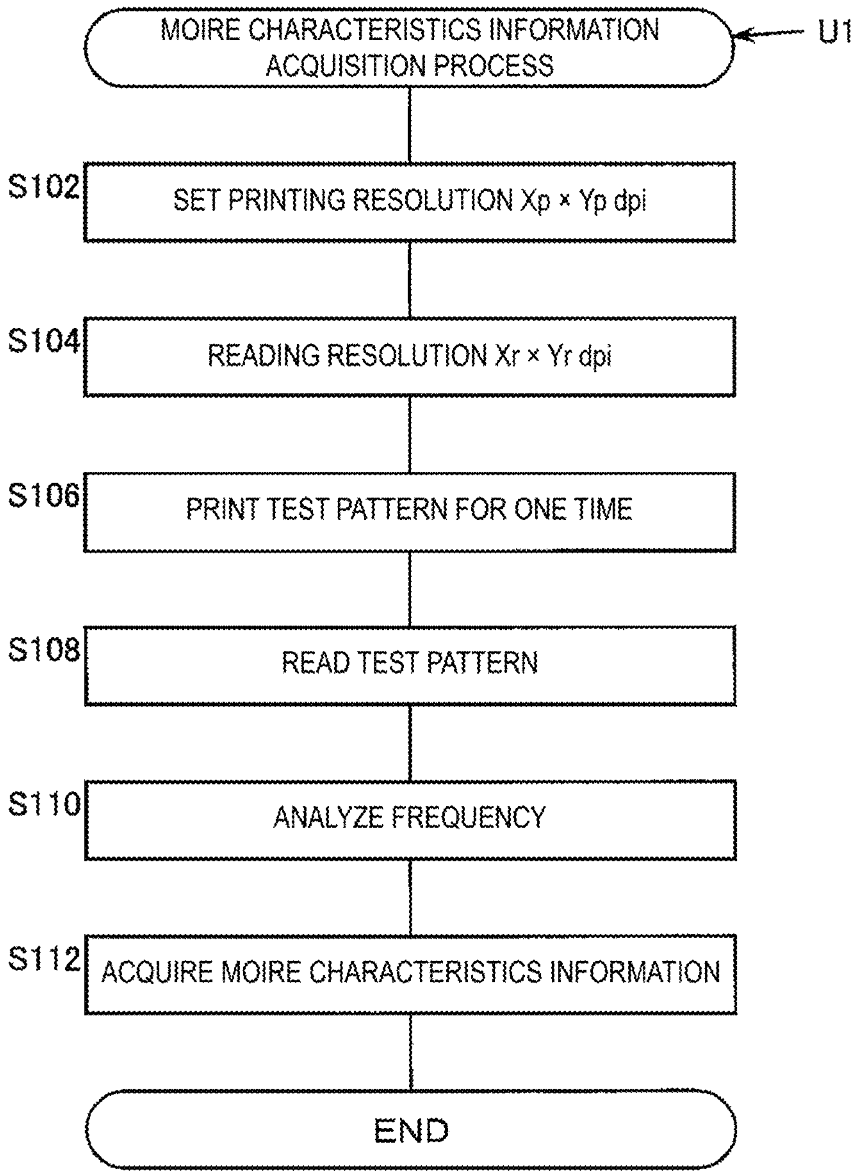
FIG. 7 is a flowchart schematically illustrating an example of a moire characteristics information acquisition process.

Next, with reference to FIG. 7 and subsequent drawings, details of the moire characteristics information IN0 are described.

FIG. 7 is a diagram illustrating schematically illustrating an example of a moire characteristics information acquisition process performed by the control unit U1, e.g., the controller 10 illustrated in FIG. 1. In the example illustrated in FIG. 7, the moire characteristics information IN0 is acquired by actually reading the test pattern TP0 with the reading unit 60. FIG. 8 is a diagram illustrating schematically illustrating an example of the moire characteristics information IN0.

First, the control unit U1 sets the printing resolution Xp×Yp dpi (step S102). In the following description, the word "step" will be omitted. For example, it is assumed that the printing resolution Xp in the X direction can be changed to a plurality of levels such as 300 dpi, 600 dpi, 900 dpi, . . . , and that the printing resolution Yp in the Y direction can be changed to a plurality of levels such as 300 dpi, 600 dpi, 900 dpi, . . . . In this case, the control unit U1 needs only to set any one printing resolution from among possible combinations of the printing resolution Xp×Yp on the premise that the processes of S302 to S320 are repeated. Next, the control unit U1 sets the reading resolution Xr×Yr dpi (S104). Here, the control unit U1 needs only to set any one printing resolution from among possible combinations of the reading resolution Xr×Yr on the premise that the process of S302 to S320 are repeated. In the case where the reading resolution Xr×Yr is fixed, the process of S104 may be omitted.

Next, the control unit U1 controls the ejection of the droplet 37 so as to form the test pattern TP0 for one time in the printing resolution Xp×Yp on the printing surface ME0*p* of the medium ME0 moving in the feeding direction D3 (S106). In this manner, the test pattern TP0 including the patches PA0 with densities of Np levels as illustrated in FIG. 2 is printed for one time.

Next, the control unit U1 causes the reading unit 60 to read the test pattern TP0 in the reading resolution Xr×Yr, and acquires the read density value Rp (X, Y) of the test pattern TP0 from the reading unit 60 (S108).

Next, the control unit U1 performs frequency analysis on the read density value Rp (X, Y), and extracts a frequency component greater than a threshold value in the read density value Rp (X, Y) (S110). The frequency analysis may be discrete Fourier transform (including two-dimensional discrete Fourier transform), fast Fourier transform (including two-dimensional fast Fourier transform), discrete cosine transform (including two-dimensional discrete cosine transform) or the like. Note that the power spectrum image generated through two-dimensional conversion such as two-dimensional fast Fourier transform on the read density value Rp (X, Y) is data in which the frequency component of each direction is distributed such that the frequency increases as it goes away from the center, with the center position set to frequency 0.

For example, the frequency threshold value for distinguishing moire from noise is Tm. Since moire has a lower frequency than noise, a frequency smaller than a threshold value Tm is determined to be moire, and the frequency not smaller than the threshold value Tm is determined to be noise. In view of this, the control unit U1 can determine that moire occurs in the read density when there is a frequency smaller than the threshold value Tm in the extracted frequency component, and can determine that moire does not occur in the read density when there is no frequency smaller than the threshold value Tm in the extracted frequency component.

In addition, the frequency analysis process at S110 may be a process in which the control unit U1 forms a power spectrum image of the read density value Rp (X, Y) on the medium ME0 or displays it on a display device to receive selection whether there is moire in the power spectrum image. In this case, the operator viewing the power spectrum image may perform the operation of selecting whether there is moire in the power spectrum image with the printing apparatus 1 by viewing the printed material or display of the power spectrum image.

Next, the control unit U1 acquires, for example, the moire characteristics information IN0 illustrated in FIG. 8 on the basis of the analysis data such as an extracted frequency component, and stores the moire characteristics information IN0 in the storage unit 23 illustrated in FIG. 1 (S112). In the moire characteristics information IN0 illustrated in FIG. 8, the conditions such as the printing resolution Xp×Yp and the reading resolution Xr×Yr are linked with information that indicates whether moire occurs. As an example excluding the conditions other than the printing resolution Xp×Yp and the reading resolution Xr×Yr, a condition with the printing resolution X1*p*×Y1*p* dpi and the reading resolution X1*r*×Y1*r* dpi is linked with information "No" about the occurrence of moire, which indicates that no moire occurs. A condition with the printing resolution X2*p*×Y2*p* dpi and the reading resolution X1*r*×Y1*r* dpi is linked with information "Yes" about the occurrence of moire, which indicates that moire occurs. Therefore, the moire characteristics information IN0 is information that can determine whether the moire of the reading density due to the interference between the arrangement of the plurality of dots 38 included in the test pattern TP0 and the reading resolution Xr×Yr at the reading unit 60 occurs The control unit U1 acquires the moire characteristics information IN0 in accordance with S102 to S112 for possible combinations of the printing resolution Xp×Yp, and possible combinations of the reading resolution Xr×Yr. When all moire characteristics information IN0 is acquired, the control unit U1 terminates the moire characteristics information acquisition process.

Figure 9:
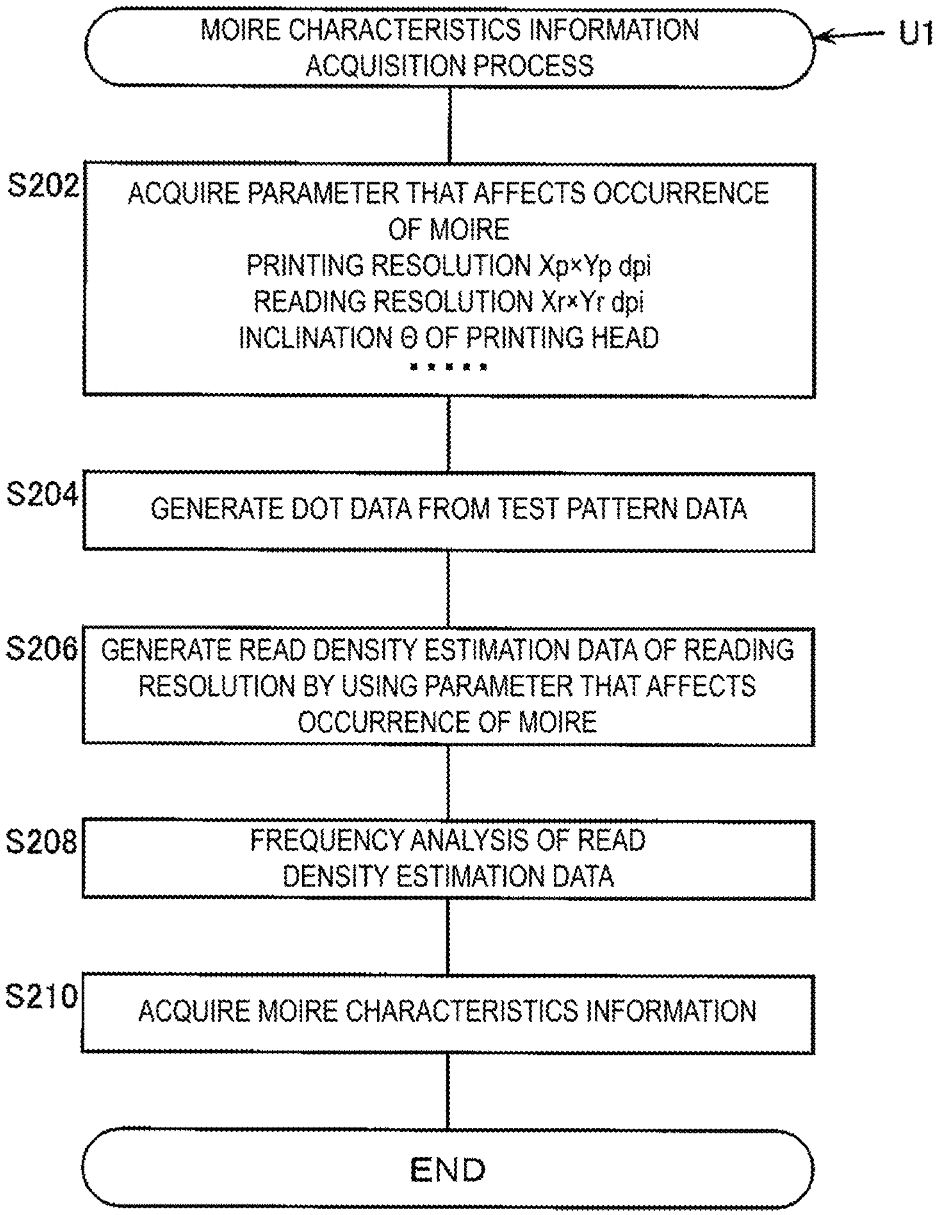
FIG. 9 is a flowchart schematically illustrating an example of the moire characteristics information acquisition process of estimating a read density.

In addition, the control unit U1 may acquire the moire characteristics information IN0 in accordance with the moire characteristics information acquisition process exemplified in FIG. 9. FIG. 9 is a diagram schematically illustrating an example of a moire characteristics information acquisition process of estimating the read density value Rp (X, Y). In the example illustrated in FIG. 9, the moire characteristics information IN0 is acquired from the analysis result on the basis of the reading resolution Xr×Yr at the reading unit 60 and the arrangement of the plurality of dots 38 determined from test pattern data representing the test pattern TP0.

First, the control unit U1 acquires a parameter that affects the occurrence of moire of the reading density (S202). The parameter that affects the occurrence of moire includes the printing resolution Xp×Yp, the reading resolution Xr×Yr, an inclination θ of the printing head 30 with respect to the reading unit 60, and as necessary, other parameters. The inclination θ may be referred to as the shift of the arrangement direction D4 of the nozzle 34 with respect to the element arrangement direction D5. In the case where the inclination θ is an inclination in a plane along the feeding direction D3 and the width direction D1, the inclination θ can be acquired by ejecting the droplet 37 from the plurality of nozzles 34 included in the nozzle row 33 to the medium ME0, reading the linear pattern formed on the printing surface ME0*p* with the reading unit 60, and detecting the orientation of the linear pattern from the obtained read density value. In addition, the inclination θ may be an inclination in a plane orthogonal to the feeding direction D3.

Next, the control unit U1 generates the dot data DA3 from the test pattern data representing the test pattern TP0 (S204). The test pattern data may be the ink amount data DA2 with a gradation value matching the patches PA0 with densities of Np levels included in the test pattern TP0, for example. The test pattern data may be the ink amount data DA2 for forming the test pattern TP0 with a single color such as achromatic color, or the ink amount data DA2 for forming the test pattern TP0 for each color of C, M, Y, and K. The control unit U1 can generate the dot data DA3 by performing a halftone process on the ink amount data DA2 at the halftone processing unit 13.

Next, the control unit U1 generates read density estimation data of the reading resolution Xr×Yr by using the arrangement of the plurality of dots 38 represented by the dot data DA3, the reading resolution Xr×Yr, the inclination θ, and as necessary other parameters (S206). The plurality of dots 38 may include dots with different sizes such as large dots, medium dots, and small dots. For example, the control unit U1 can estimate the read density value Rp (X, Y) in a unit of the reading resolution Xr×Yr by simulation on the basis of the obtained arrangement of the plurality of dots 38, inclination θ, and as necessary other parameters.

Next, the control unit U1 performs frequency analysis on read density estimation data, e.g., the read density value Rp (X, Y), and extracts a frequency component greater than a threshold value in the read density value Rp (X, Y) (S208). Here, the frequency analysis may be discrete Fourier transform (including two-dimensional discrete Fourier transform), fast Fourier transform (including two-dimensional fast Fourier transform), discrete cosine transform (including two-dimensional discrete cosine transform) or the like. For example, the frequency smaller than the frequency threshold value Tm for distinguishing moire from noise is determined to be moire, and the frequency not smaller than the threshold value Tm is determined to be noise. In view of this, the control unit U1 can determine that moire occurs in the read density when there is a frequency smaller than the threshold value Tm in the extracted frequency component, and can determine that moire does not occur in the read density when there is no frequency smaller than the threshold value Tm in the extracted frequency component.

In addition, the frequency analysis process at S208 may be a process in which the control unit U1 forms a power spectrum image of the read density value Rp (X, Y) on the medium ME0 or displays it on a display device to receive selection whether there is moire in the power spectrum image. Next, the control unit U1 acquires, for example, the moire characteristics information IN0 illustrated in FIG. 8 on the basis of the analysis data such as an extracted frequency component, and stores the moire characteristics information IN0 in the storage unit 23 illustrated in FIG. 1 (S210). In this case, the operator viewing the power spectrum image may perform the operation of selecting whether there is moire in the power spectrum image with the printing apparatus 1 by viewing the printed material or display of the power spectrum image.

Next, the control unit U1 acquires, for example, the moire characteristics information IN0 illustrated in FIG. 8 on the basis of the analysis data such as an extracted frequency component, and stores the moire characteristics information IN0 in the storage unit 23 illustrated in FIG. 1 (S210).

After acquiring the moire characteristics information IN0, the control unit U1 terminates the moire characteristics information acquisition process.

Note that the processes of S102 to S110 illustrated in FIG. 7 and the processes S202 to S208 illustrated in FIG. 9 may be performed with an external computer other than the printing apparatus 1. In this case, the control unit U1 may acquire the moire characteristics information IN0 from the above-described external computer at S112 illustrated in FIG. 7 and/or S210 illustrated in FIG. 9.

(4) Specific Examples of Process of Correcting Printing Characteristics

An example of a process of correcting printing characteristics is described below with reference to FIG. 10 and the like.

FIG. 10 is a diagram schematically illustrating an example of the density correction process of correcting the density of the printing image IMO. The density correction process illustrated in FIG. 10 is performed by the control unit U1, e.g., the controller 10 illustrated in FIG. 1. When receiving a density correction instruction using the test pattern TP0 from the host apparatus HO1 or the operation panel 24, the controller 10 starts the density correction process, for example. As described above, it is assumed that the moire characteristics information IN0 illustrated in FIG. 8 is stored in the storage unit 23. In FIG. 10, S306 corresponds to step ST1 of acquiring the moire characteristics information IN0, S310 corresponds to the first formation step ST2 of forming the test pattern TP0 N1 times, and S312 corresponds to the second formation step ST3 of forming the test pattern TP0 N2 times.

When the density correction process is started, the controller 10 sets the printing resolution Xp×Yp dpi of the test pattern TP0 (S302). The controller 10 may receive the setting of the printing resolution Xp×Yp from the host apparatus HO1 or the operation panel 24.

Next, the controller 10 sets the reading resolution Xr×Yr dpi of the test pattern TP0 (S304). The controller 10 may receive the setting of the reading resolution Xr×Yr from the host apparatus HO1 or the operation panel 24. In the case where the reading resolution Xr×Yr is fixed, the process of S304 may be omitted.

Next, the controller 10 acquires the moire characteristics information IN0 corresponding to the set printing resolution Xp×Yp and reading resolution Xr×Yr (S306).

Next, the controller 10 determines whether the acquired moire characteristics information IN0 indicates the occurrence of moire of the reading density (S308). In the moire characteristics information IN0 illustrated in FIG. 8, when the printing resolution is X1*p*×Y1*p* dpi and the reading resolution is X1*r*×Y1*r* dpi as an example excluding the conditions other than the printing resolution and the reading resolution, the occurrence of moire of the moire characteristics information IN0 is "No", and as such the moire characteristics information IN0 does not indicate the occurrence of moire. In this case, the control unit U1 advances the process to S310. When the printing resolution is X2p×Y2p dpi and the reading resolution is X1r×Y1r dpi, the occurrence of moire of the moire characteristics information IN0 is "Yes", and as such the moire characteristics information IN0 indicates the occurrence of moire. In this case, the control unit U1 advances the process to S312.

When the moire characteristics information IN0 does not indicate the occurrence of moire of the reading density, the controller 10 controls the ejection of the droplet 37 such that the test pattern TP0 including the patches PA0 with densities of Np levels is formed on the medium ME0 N1 times as illustrated in FIG. 5 (S310). As described above, the number of times N1 the test pattern TP0 is formed in the case of "No" occurrence of moire is an integer of 1 or more, which is smaller than the number of times N2 the test pattern TP0 is formed in the case of the occurrence of moire "Yes".

When the moire characteristics information IN0 indicates the occurrence of moire of the reading density, the controller 10 controls the ejection of the droplet 37 such that the test pattern TP0 including the patches PA0 with densities of Np levels is formed on the medium ME0 N2 times as illustrated in FIGS. 2 and 5 (S312). As described above, the number of times N2 the test pattern TP0 is formed in the case of the occurrence of moire "Yes" is greater than the number of times N1 the test pattern TP0 is formed in the case of "No" occurrence of moire.

Subsequent to the process of S310 or S312, the controller 10 causes the reading unit 60 to read the test patterns TP0 for N1 times or N2 times in the reading resolution Xr×Yr, and acquires the read density value Rp, i (X, Y) of each patch PA0 from the reading unit 60 (S314). The read density value Rp, i (X, Y) is the read density value of the reading resolution Xr×Yr of each patch PA0 included in the test patterns TP0 for N1 times or N2 times.

Next, the controller 10 calculates the read density value Rp, i (Y) in a unit of the reading resolution Yr of each patch PAG by averaging the read density value Rp, i (X, Y) of each patch PAG included in the test patterns TP0 for N1 times or N2 times for each Y position (S316).

Next, when the number of times the test pattern TP0 is formed is two times or more, the controller 10 calculates the read density average value Rp (Y) in a unit of the reading resolution Yr by averaging the read density value Rp, i (Y) for each density of the patch PAG (S318). In the case of N1=1, i.e., when the number of times the test pattern TP0 is formed is one time, the controller 10 handles the read density value Rp, i (Y) as the read density average value Rp (Y) as it is.

Next, the controller 10 determines the correction value of each nozzle 34 by calculating the read density value G2 (Y) of each nozzle 34 by using the read density average value Rp (Y) in a unit of the reading resolution Yr (S320). The density correction of the printing image IMO is performed such that the read density value G2 (Y) is the input density value G1 (Y) for the ink amount data DA2 as illustrated in FIG. 6, for example. The controller 10 may determine the input density value G1 (Y) corresponding to the read density value G2 (Y) as the density correction value G3 (Y) for all gradation values from 0 to 255. As described above, the correction value may be a value representing a difference between the input density value G1 (Y) and the read density value G2 (Y), or the read density value G2 (Y) itself, or, the density correction value G3 (Y).

After the process of S320, the controller 10 terminates the density correction process. Thereafter, the controller 10 forms the printing image IMO with the corrected density on the medium ME0 by correcting the ink amount data DA2 such that the read density value G2 (Y) is the input density value G1 (Y) during formation of the printing image IMO based on the original image data DA1.

In the above-described manner, when the moire occurs in the read density, the test pattern TP0 is formed on the medium ME0 N2 times N2 times, which is greater than N1 times for the case where moire does not occur in the read density. The moire of the reading density occurred in a plurality of the patches PAG with the same density tends to be different from each other. In view of this, by reading the test patterns TP0 for N2 times at the reading unit 60, reading results with less influence of moire can be obtained. For example, the read density average value Rp (Y) with less influence of moire is obtained from the read density value Rp, i (Y) for N2 times, and thus the correction value with less influence of moire is calculated. On the other hand, when moire does not occur in the read density, the test pattern TP0 is formed on the medium ME0 only N1 times, which is less than N2 times for the case where the moire occurs in the read density. In this manner, the number of the formed test patterns TP0 can be reduced. Thus, this specific example can efficiently reduce the influence of moire when reading the test pattern TP0.

As a result, it is possible to reduce the influence of moire of the read density, which tends to easily occur in a CIS image sensor as a mainstream in MFPs (multifunctional devices) and the like, and it is possible to perform density correction in a unit of nozzle by using a self scanner. In this manner, merits such as reduction in service load and replacement of the printing head by the user can be achieved.

(5) Modifications

Various modifications of the present disclosure may be made.

For example, the printer 2 is not limited to a line-type printer in which a plurality of nozzles is continuously disposed side by side over the width direction D1, and the printer 2 may be a serial-type printer in which the printing head 30 moves along the main scanning direction intersecting the feeding direction D3, or the like. Specifically, the scanning direction in which at least one of the medium ME0 and the printing head 30 moves is not limited to the direction along the feeding direction D3, and may be a direction intersecting the feeding direction D3.

In the scanning direction, the conveyance unit 50 may move the printing head 30 instead of moving the medium ME0, or may move both the medium ME0 and the printing head 30.

As long as the density of the printing surface ME0p can be read in a unit of the reading resolution, the reading unit 60 is not limited to the reading unit including the plurality of reading elements 61 disposed side by side so as to set the reading resolution Yr in the Y direction. For example, the plurality of reading elements 61 may be disposed side by side so as to set the reading resolution Xr in the X direction, or may be disposed side by side in a two-dimensional form in the X direction and the Y direction.

The type of the color material for forming the printing image IMO on the medium ME0 is not limited to C, M, Y, and K, and may include orange, green, light cyan with a lower density than C, light magenta with a lower density than M, dark yellow with a higher density than Y, light black with a lower density than K, a non-coloring color material for image quality improvement, and the like in addition to C, M, Y, and K. In addition, this technology is applicable to a case where some of color materials of C, M, Y, and K is not used.

In the case where the test pattern TP0 is formed multiple times on the medium ME0, the order of a plurality of the patches PAG included in each test pattern TP0 in the scanning direction may not be the same, and may be different from each other.

The test pattern TP0 is not limited to the test pattern for correcting the density of the printing image IMO. The test pattern TP0 may be a ruled line pattern for acquiring the conveyance amount of the medium ME0, a test pattern for matching the impinging position of the droplet 37 between forward and backward paths in a printer including a carriage, or the like. This technology is applicable to a case where the moire of the reading density affects the reading of the test pattern.

The number of times N2 the test pattern TP0 is formed in the case where the moire characteristics information IN0 indicates the occurrence of moire may differ depending on the ease of the occurrence of moire. For example, a frequency threshold value lower than the frequency threshold value Tm is set as Tn. The control unit U1 may determine that the ease of occurrence of moire is high when there is a frequency smaller than the threshold value Tn in the frequency component extracted by frequency analysis, and determine that the ease of occurrence of moire is medium when there is no frequency smaller than the threshold value Tn in the above-described extracted frequency component but there is a frequency smaller than the threshold value Tm.

The moire characteristics information IN0 needs only to be information that can determine whether the moire of the reading density occurs, and the moire characteristics information IN0 may be a result it self of reading the test pattern TP0 in a unit of the reading resolution, read density estimation data itself, or the like.

Specifically, in the specification the expression "can be determined" is a wording including the meaning of estimation, and includes the meaning of estimation of the occurrence of moire in a test pattern formed chronologically later than the present.

In the above-described specific example, the moire characteristics information IN0 is described with the conditions other than the printing resolution and the reading resolution excluded, but the presence/absence of the occurrence of moire may be determined based on other conditions.

In this case, when the occurrence of moire is determined to be "Yes" for only a part of the test pattern TP0, it is possible to perform the formation N2 times only for the portion where the occurrence of moire is determined to be "Yes", and N1 times for the portion where the occurrence of moire is determined to be "No".

More specifically, in the case where the moire characteristics information IN0 is determined based on the printing resolution, the reading resolution and the gradation value, and, among the patches PA0 in FIG. 2, the occurrence of moire is determined to be "Yes" for only three patches PA0 with high gradation values, while the occurrence of moire is determined to be "No" for the other patches PA0, it is possible to perform a control of the formation N2 times only for the three patches PA0 with high gradation values, and N1 times for the other patches PA0.

Naturally, the wording of the formation of the test patterns N2 times encompasses the above-described control.

The subject that performs the above-described process is not limited to CPU, but may be electronic components other than CPU such as ASIC. Naturally, a plurality of CPUs may perform the above-described process in conjunction with each other, or the CPU and other electronic components (such as ASIC) may perform the above-described process in conjunction with each other.

The above-described process may be modified as needed, for example, by changing the order of the processes. For example, in moire characteristics information acquisition process illustrated in FIG. 7, the reading resolution setting process at S104 is performed before the printing resolution setting process at S102.

A part of the above-described process may be performed by the host apparatus HO1. In this case, the combination of the controller 10 and the host apparatus HO1 is an example of the printing apparatus 1.

Figure 11:
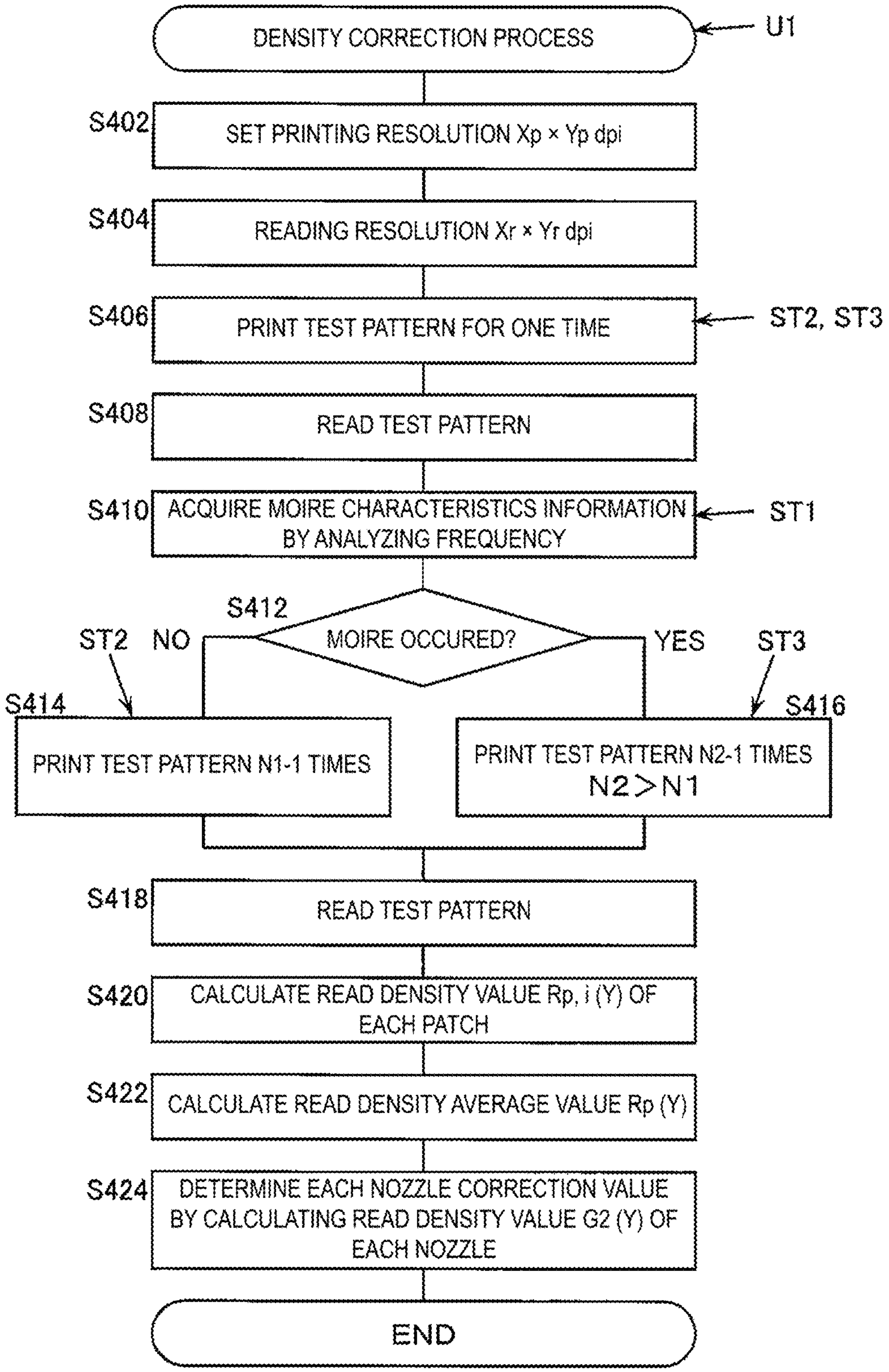
FIG. 11 is a flowchart schematically illustrating an example of the density correction process.

As illustrated in FIG. 11, the control unit U1 may acquire the moire characteristics information IN0 on the basis of the reading of the test pattern TP0 after starting the density correction process. FIG. 11 is a diagram schematically illustrating another example of the density correction process of correcting the density of the printing image IMO. In FIG. 11, S410 corresponds to step ST1 of acquiring the moire characteristics information IN0, S406 and S414 correspond to the first formation step ST2 of forming the test pattern TP0 N1 times, and S406 and S416 correspond to the second formation step ST3 of forming the test pattern TP0 N2 times.

When the density correction process is started, the controller 10 sets the printing resolution Xp×Yp dpi of the test pattern TP0 (S402), and sets the reading resolution Xr×Yr dpi of the test pattern TP0 as necessary (S404).

Next, the controller 10 controls the ejection of the droplet 37 so as to form the test pattern TP0 for one time in the printing resolution Xp×Yp on the printing surface ME0*p* of the medium ME0 moving in the feeding direction D3 (S406).

Next, the controller 10 causes the reading unit 60 to read the test pattern TP0 in the reading resolution Xr×Yr, and acquires the read density value Rp (X, Y) of the test pattern TP0 from the reading unit 60 (S408).

Next, the controller 10 performs frequency analysis on the read density value Rp (X, Y), and extracts a frequency component greater than a threshold value in the read density value Rp (X, Y) to acquire the moire characteristics information IN0 on the basis of the obtained analysis data (S410). The acquired moire characteristics information IN0 needs only to be the information that can determine whether the moire of the reading density occurs in this density correction process, and therefore may be information indicating whether "the occurrence of moire" is "Yes" or "No" as illustrated in FIG. 8. For example, the controller 10 may acquire the moire characteristics information IN0 that indicates the occurrence of moire "Yes" when there is a frequency smaller than the threshold value Tm in the extracted frequency component, and acquire the moire characteristics information IN0 that indicates the occurrence of moire "No" when there is no frequency smaller than the threshold value Tm in the extracted frequency component.

Next, the controller 10 determines whether the acquired moire characteristics information IN0 indicates the occurrence of moire of the reading density (S412).

In the case where the moire characteristics information IN0 does not indicate the occurrence of moire of the reading density, and the number of times N1 the test pattern TP0 formed in the case of "No" occurrence of moire is two or more, the controller 10 controls the ejection of the droplet 37 such that the test pattern TP0 including the patches PAC with densities of Np levels is additionally formed on the medium ME0 N1-1 times as illustrated in FIG. 5 (S414). In the case of N1=1, the controller 10 does not perform the process of forming the test pattern TP0, and handles the read density value Rp (X, Y) acquired at S408 as the read density value Rp, i (X, Y), and, advances the process to S420.

When the moire characteristics information IN0 indicates the occurrence of moire of the reading density, the controller 10 controls the ejection of the droplet 37 such that the test pattern TP0 including the patches PA0 with densities of Np levels is additionally formed on the medium ME0 N2-1 times as illustrated in FIGS. 2 and 5 (S416).

Subsequent to the process of S414 or S416, the controller 10 causes the reading unit 60 to read the test pattern TP0 for N1-1 or N2-1 times in the reading resolution Xr×Yr, and acquires the read density value Rp, i (X, Y) of each patch PAC from the reading unit 60 (S418). Here, the controller 10 also handles the read density value Rp (X, Y) acquired at S408 as the read density value Rp, i (X, Y). Accordingly, the read density value Rp, i (X, Y) becomes the read density value of the reading resolution Xr×Yr of each patch PA0 included in the test patterns TP0 for N1 times or N2 times.

Next, the controller 10 calculates the read density value Rp, i (Y) in a unit of the reading resolution Yr of each patch PA0 by averaging the read density value Rp, i (X, Y) of each patch PA0 included in the test patterns TP0 for N1 times or N2 times for each Y position (S420).

Next, when the number of times the test pattern TP0 is formed is two times or more, the controller 10 calculates the read density average value Rp (Y) in a unit of the reading resolution Yr by averaging the read density value Rp, i (Y) for each density of the patch PA0 (S422). In the case of N1=1, the controller 10 handles the read density value Rp, i (Y) as the read density average value Rp (Y) as it is.

Next, the controller 10 determines the correction value of each nozzle 34 by calculating the read density value G2 (Y) of each nozzle 34 by using the read density average value Rp (Y) in a unit of the reading resolution Yr (S424). After the process of S424, the controller 10 terminates the density correction process.

In the above-described manner, the example illustrated in FIG. 11 can dynamically and efficiently reduce the influence of moire when reading the test pattern TP0.

(6) Conclusion

As described above, the various aspects of the present disclosure can provide the technology and the like that can efficiently reduce the influence of moire when reading the test pattern. Naturally, the basic operations and effects described above can be obtained even with technology consisting solely of the constituent elements pertaining to the independent claims.

It is also possible to implement configurations in which each of the configurations disclosed in the examples above is mutually substituted or combined, configurations in which each of the configurations disclosed in the known technology and the above-described examples is mutually substituted or combined, and the like. The present disclosure also includes these configurations and the like.

What is claimed is:

1. A printing apparatus comprising:

a printing head including a nozzle row in which a plurality of nozzles configured to eject a droplet to a medium are disposed side by side;

a control unit configured to control movement of at least one of the medium and the printing head in a scanning direction intersecting an arrangement direction of the plurality of nozzles, and ejection of the droplet from the printing head; and a reading unit configured to read a density of a printing surface of the medium in a unit of a reading resolution, wherein the printing apparatus forms a test pattern for correcting printing characteristics on the medium and corrects the printing characteristics based on a reading result of the test pattern obtained by the reading unit, the control unit acquires moire characteristics information for determining whether moire of a reading density due to an interference between an arrangement of a plurality of dots included in the test pattern and the reading resolution at the reading unit occurs, when the moire characteristics information does not indicate occurrence of the moire, the control unit controls the ejection of the droplet such that the test pattern is formed on the medium N1 times, N1 being an integer of 1 or more, and when the moire characteristics information indicates occurrence of the moire, the control unit controls the ejection of the droplet such that the test pattern is formed on the medium N2 times and such that the test pattern formed at a first time among the N2 times and the test pattern formed at a second time among the N2 times are arranged next to each other on the medium, N2 being an integer greater than N1.

2. The printing apparatus according to claim 1, wherein the test pattern includes patches with densities of a plurality of levels disposed side by side in the scanning direction, and when the moire characteristics information indicates occurrence of the moire, the control unit controls the ejection of the droplet such that the test pattern including the patches with densities of the plurality of levels is formed at N2 locations on the medium.

3. The printing apparatus according to claim 2, wherein the patches with the densities of the plurality of levels are patches with densities of 10 or more levels.

4. The printing apparatus according to claim 2, further comprising a conveyance unit configured to move at least one of the medium and the printing head along the scanning direction so as to change the medium from a position facing the printing head to a position facing the reading unit, wherein when the moire characteristics information indicates occurrence of the moire, the control unit controls the ejection of the droplet such that the test pattern including the patches with densities of the plurality of levels is formed at N2 locations that are different in the scanning direction on the medium, and the reading unit includes a plurality of reading elements disposed side by side to achieve the reading resolution along an element arrangement direction intersecting the scanning direction, and reads the density of the printing surface with the plurality of reading elements.

5. The printing apparatus according to claim 1, further comprising a conveyance unit configured to move at least one of the medium and the printing head so as to change the medium from a position facing the printing head to a position facing the reading unit.

6. The printing apparatus according to claim 1, wherein the control unit calculates a correction value for correcting the printing characteristics by acquiring a read density of each test pattern formed N2 times based on the reading result, and performing a calculation process including a computation of averaging the read density obtained N2 times.

7. The printing apparatus according to claim 1, wherein when the moire characteristics information indicates the occurrence of the moire, the control unit controls the ejection of the droplet such that the test pattern formed at the first time and the test pattern formed at the second time are arranged in the scanning direction next to each other on the medium.

8. A printing method in which at least one of a medium and a printing head including a nozzle row in which a plurality of nozzles configured to eject a droplet to the medium are disposed side by side is moved along a scanning direction intersecting an arrangement direction of the plurality of nozzles, a test pattern for correcting printing characteristics is formed on the medium by ejecting the droplet from the printing head, and the printing characteristics are corrected based on a reading result of the test pattern obtained by a reading unit configured to read a density of a printing surface of the medium in a unit of a reading resolution, the printing method comprising:

acquiring moire characteristics information for determining whether moire of a reading density due to an interference between an arrangement of a plurality of dots included in the test pattern and the reading resolution at the reading unit occurs, forming the test pattern on the medium N1 times when the moire characteristics information does not indicate occurrence of the moire, N1 being an integer of 1 or more, and forming the test pattern on the medium N2 times such that the test pattern formed at a first time among the N2 times and the test pattern formed at a second time among the N2 times are arranged next to each other on the medium when the moire characteristics information indicates occurrence of the moire, N2 being an integer greater than N1.

* * * * *